US009686799B2

(12) United States Patent
Chen et al.

(10) Patent No.: US 9,686,799 B2
(45) Date of Patent: Jun. 20, 2017

(54) USER EQUIPMENT AND METHOD FOR MATCHING INTERFERENCE CHANNEL CODEWORD IN INTER-CELL MULTI-AERIAL COORDINATED SYSTEM

(71) Applicant: ZTE CORPORATION, Shenzhen, Guangdong Province (CN)

(72) Inventors: Shijun Chen, Shenzhen (CN); Ke Yao, Shenzhen (CN)

(73) Assignee: ZTE CORPORATION (CN)

( * ) Notice: Subject to any disclaimer, the term of this patent is extended or adjusted under 35 U.S.C. 154(b) by 234 days.

(21) Appl. No.: 14/411,992

(22) PCT Filed: Aug. 9, 2013

(86) PCT No.: PCT/CN2013/081167
§ 371 (c)(1),
(2) Date: Dec. 30, 2014

(87) PCT Pub. No.: WO2014/023265
PCT Pub. Date: Feb. 13, 2014

(65) Prior Publication Data
US 2015/0156784 A1 Jun. 4, 2015

(30) Foreign Application Priority Data
Aug. 10, 2012 (CN) .......................... 2012 1 0284884

(51) Int. Cl.
*H04B 7/216* (2006.01)
*H04W 72/08* (2009.01)
(Continued)

(52) U.S. Cl.
CPC .......... *H04W 72/082* (2013.01); *H04B 7/024* (2013.01); *H04B 17/336* (2015.01);
(Continued)

(58) Field of Classification Search
CPC ............................ H04B 7/024; H04W 72/082
See application file for complete search history.

(56) References Cited

U.S. PATENT DOCUMENTS

| 2010/0002643 A1* | 1/2010 | Han .................... H04B 7/0417 |
| | | 370/329 |
| 2011/0135024 A1 | 6/2011 | Seo et al. |
| 2011/0149877 A1 | 6/2011 | Hafeez |

FOREIGN PATENT DOCUMENTS

| CN | 101868017 A | 10/2010 |
| CN | 102342032 A | 2/2012 |

(Continued)

OTHER PUBLICATIONS

European Search Report dated Jun. 22, 2015.of European patent Application No. 13828722.2.
(Continued)

*Primary Examiner* — Derrick Ferris
*Assistant Examiner* — Farhad Ali
(74) *Attorney, Agent, or Firm* — Plumsea Law Group, LLC (57) ABSTRACT

The embodiment of the present document provides a method for matching an interference channel codeword in an inter-cell multi-antenna coordinated system, including: a user equipment obtaining a signal to interference plus noise ratio (SINR), or obtaining a SINR and a signal to noise ratio (SNR), and comparing the SINR, or the SINR and the SNR, with a preset threshold, generating coordinated multi-point transmission/reception (COMP) policy information according to a comparison result, and transmitting the COMP policy information to the base station. The present document further provides a user equipment.

18 Claims, 4 Drawing Sheets

(51) Int. Cl.
*H04B 7/024* (2017.01)
*H04W 72/04* (2009.01)
*H04L 5/00* (2006.01)
*H04B 17/336* (2015.01)

(52) U.S. Cl.
CPC .......... *H04L 5/0035* (2013.01); *H04L 5/0073* (2013.01); *H04W 72/0413* (2013.01); *H04W 72/0466* (2013.01)

(56) References Cited

FOREIGN PATENT DOCUMENTS

| CN | 102598525 A | 7/2012 |
| EP | 2432268 A1 | 3/2012 |
| WO | 2011/125131 A1 | 10/2011 |

OTHER PUBLICATIONS

3GPP, R1-084141, Draft "UE PMI Feedback Signalling for User Pairing/Coordination"; Alcatel-Lucent, Cedex, France; Nov. 4, 2008, pp. 1-3.

3GPP, R1-113766, Draft "CQI Computation for CoMP"; ZTE, Cedex, France; Nov. 8, 2011, pp. 1-6.

* cited by examiner

USER EQUIPMENT AND METHOD FOR MATCHING INTERFERENCE CHANNEL CODEWORD IN INTER-CELL MULTI-AERIAL COORDINATED SYSTEM

CROSS-REFERENCE TO RELATED APPLICATION(S)

This application is the U.S. National Phase application of PCT application number PCT/CN2013/081167 having a PCT filing date of Aug. 9, 2013, which claims priority of Chinese patent application 201210284884.9 filed on Aug. 10, 2012, the disclosures of which are hereby incorporated by reference.

TECHNICAL FIELD

The present document relates to a technology for matching an interference channel codeword in an inter-cell multi-antenna coordinated system, and in particular, to a method for matching an interference channel codeword in an inter-cell multi-antenna coordinated system and a user equipment.

BACKGROUND OF THE RELATED ART

As the standard of the fourth generation communication system (4G), the IMT-Advanced provides higher requirements for the system performance, and especially it has higher requirements for the uplink and downlink frequency efficiencies. The coordinated multi-point transmission/reception (COMP) is a technology that increases the coverage area of high speed transmission, the quality and throughput of cell edge service and the system throughput, and becomes an important technology to improve the spectral utilization efficiency of the system, therefore, it gets the extensive attentions. The so-called coordinated multi-point transmission/reception is a plurality of base stations cooperate and transmit, serving one or more of user terminals (User Equipment, UE). The COMP defined by the 3GPP includes 2 scenes; one is multi-point cooperated scheduling, that is, through exchanging the scheduling information among the adjacent nodes, to achieve that the interference among the transmission signals of various cells is coordinated; the other is the multi-point joint processing, that is, a plurality of cooperated nodes jointly provide the service for the target users through the shared data and the channel state information (CSI), the scheduling information, etc. The advantage of the multi-point cooperated scheduling is that it does not need too much exchanged information among various nodes and the wireless interface is not influenced, and its disadvantage is that it is unable to obtain the cooperated transmission gain, and there is no contribution to the improvement of the spectral utilization efficiency. The multi-point joint processing can obtain the macro diversity and the cooperated transmission gain and can obtain the processing gain of the high-order antenna. And its disadvantage is that it needs the exchange of a large amount of data information and CSI information, and the complexity is high.

Figure 1:
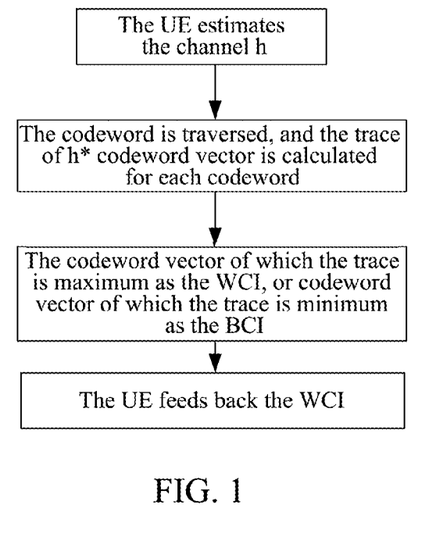
FIG. 1 is a diagram of a typical method for matching a codeword currently.

The current method for matching the Comp typical codeword is shown as in FIG. 1, which performs the multiplication for the interference channel and all codewords respectively, calculating the norm of the matrix after the multiplication, and then traverses all calculation results and selects the codeword with the maximum norm as the worst codeword index (WCI), or selects the codeword with the minimum norm as the best codeword index (BCI), but it does not perform selection and feedback self-adaptively.

This method only considers the correlation between the interference channel and the codeword, and under the comp situation, this method has the following several problems.

1, it can not measure the degree of accuracy between the codeword and the channel, especially the match of the interference channel; and if the difference is very large, then the result of comp algorithm will be distorted.

2, it only performs the codeword for the interference channel itself, which cannot guarantee the codeword result is the exact and accurate codeword; if it is under the situation of feedback WCI, the precoding is the worst under the channel, but it cannot guarantee that it is the worst under the detection algorithm.

3, at present, there is no difference in the algorithm for different scenes, which causes the situation of the gain to be unstable as well.

SUMMARY OF THE INVENTION

The technical problem that the embodiment of the present document requires to solve is to provide a method for matching an interference channel codeword in an inter-cell multi-antenna coordinated system and a user equipment, to reduce the distortion and make the gain stable.

In order to solve the above-mentioned problem, the following technical scheme is adopted:

a method for matching an interference channel codeword in an inter-cell multi-antenna coordinated system, comprising:

a user equipment obtaining a signal to interference plus noise ratio (SINR), or obtaining a SINR and a signal to noise ratio (SNR), and comparing the SINR, or the SINR and the SNR, with a preset threshold, generating coordinated multi-point transmission/reception (COMP) policy information according to a comparison result, and transmitting the COMP policy information to a base station.

Alternatively, the step of the user equipment obtaining the SINR comprises:

obtaining a signal energy of serving cell of the user equipment and an average interference energy of each interference channel of the user equipment, and dividing the signal energy of serving cell by the sum of the average interference energy of each interference channel and noise to obtain the SINR.

Alternatively, the method further comprises: using a first mark to carry the COMP policy information;

the step of comparing the SINR, or the SINR and the SNR, with the preset threshold and generating the COMP policy information according to the comparison result comprises:

if the SINR is greater than a first threshold, a value of the first mark being a first assigned value, to indicate that the user equipment can respond to cooperation requests of other base stations;

if the SINR is less than or equal to the first threshold and greater than a second threshold, then the value of the first mark being a second assigned value, to indicate that the user equipment will not participate in cooperation of other base stations when other base stations are not requested to cooperate; if the user equipment requests other base stations to cooperate, then the user equipment being able to respond to cooperation requests of other base stations; and if the SINR is less than or equal to the second threshold, then comparing the SNR with a sixth threshold; if the SNR is greater than the sixth threshold, then the value of the first mark being a third assigned value, to indicated that the user equipment can participate in the cooperation; if the SNR is less than or equal to the sixth threshold, then the value of the first mark being a fourth assigned value, to indicate that the user equipment does not participate in the cooperation.

Alternatively, the method further comprises:

if the SINR is less than or equal to the second threshold, then performing the following steps:

obtaining a worst codeword index (WCI) or a best codeword index (BCI) of each interference channel;

determining whether the WCI or the BCI meets a preset condition, comprising: for each interference channel whose WCI or BCI is obtained, determining whether a pre-gain of the interference channel cooperation is greater than a fifth threshold; if greater than the fifth threshold and the SNR is greater than a sixth threshold, then the WCI or the BCI meeting the preset condition; and the user equipment further feeding back the BCI or the WCI meeting the preset condition to the base station.

Alternatively, the step of obtaining the WCI or the BCI of each interference channel comprising:

obtaining a maximum interference space of G1*interference channel for each interference channel of the user equipment, for each vector in the maximum interference space, projecting every code word in a codeword to the vector, obtaining a code word, of which a norm is maximum and greater than an assigned threshold after projecting; if code words of which the number is the same with the number of vectors of the maximum interference space are found, then taking these code words as WCI;

if code words of which the number is the same with the number of vectors of the maximum interference space are not found, then obtaining a minimum interference space of G1*interference channel; for each vector in the minimum interference space, projecting every code word in the codeword to the vector, obtaining a code word, of which a norm is maximum and greater than an assigned threshold after projecting; if at least one code word can be obtained, then taking the obtained code word as BCI;

wherein the G1 is a detection factor of a detection algorithm currently used by the user equipment.

Alternatively, the G1=a serving cell channel multiplied by a pre-coding matrix indicator (PMI), then transposed; or G1=(F' F)$^{-1}$ F', and F=the serving cell channel multiplied by the PMI.

Alternatively, the step of obtaining the maximum interference space of the G1*interference channel comprises:

performing SVD decomposition on the G1*interference channel, taking a subset from all singular values, wherein the sum of singular values in the subset and the sum of all singular values are greater than a third threshold, taking a V vector corresponding to the singular values in the subset as a vector in the maximum interference space;

the minimum interference space is obtained through the following mode:

performing SVD decomposition on the G1*interference channel, and taking a V vector corresponding to non-singular values as a vector in the minimum interference space.

Alternatively, the step of determining whether the pre-gain of the interference channel cooperation is greater than the fifth threshold for each interference channel of the obtained WCI or BCI comprises:

for any one interference channel, obtaining the signal energy of serving cell, divided by the sum of energies of various interference channels, except the interference channel self, and noise energy, and obtaining a SINR_max; and comparing a value obtained by performing subtraction on the SINR_max and SINR with the fifth threshold, if greater than the fifth threshold, then the pre-gain of the interference channel cooperation being greater than the fifth threshold, otherwise, the pre-gain of the interference channel cooperation being less than or equal to the fifth threshold.

A user equipment comprises: a policy information generation unit and a feedback unit, wherein the policy information generation unit is configured to: obtain a signal to interference plus noise ratio (SINR), or obtain a SINR and a signal to noise ratio (SNR), and compare the SINR or the SINR and SNR, with a preset threshold, and generate coordinated multi-point transmission/reception (COMP) policy information according to a comparison result; and the feedback unit is configured to: transmit the COMP policy information to a base station.

Alternatively, the policy information generation unit is configured to: obtain the SINR by the following mode:

obtaining a signal energy of serving cell of the user equipment and an average interference energy of each interference channel of the user equipment, and dividing the signal energy of serving cell by the sum of the average interference energy of each interference channel and noise to obtain the SINR.

Alternatively, the policy information generation unit is further configured to: use a first mark to indicate the COMP policy information;

the policy information generation unit is configured to generate the COMP policy information by the following mode:

if the SINR is greater than a first threshold, a value of the first mark being a first assigned value, to indicate that the user equipment can respond to cooperation requests of other base stations;

if the SINR is less than or equal to the first threshold and greater than a second threshold, then the value of the first mark being a second assigned value, to indicate that the user equipment will not participate in cooperation of other base stations when other base stations are not requested to cooperate; if the user equipment requests other base stations to cooperate, then the user equipment being able to respond to the cooperation requests of other base stations; and if the SINR is less than or equal to the second threshold, then comparing the SNR with a sixth threshold; if the SNR is greater than the sixth threshold, then the value of the first mark being a third assigned value, to indicate that the user equipment can participate in the cooperation; if the SNR is less than or equal to the sixth threshold, then the value of the first mark being a fourth assigned value, to indicate that the user equipment does not participate in the cooperation.

Alternatively, the user equipment further comprises a codeword matching unit and a judgment unit, wherein the codeword matching unit is configured to: obtain a worst codeword index (WCI) or a best codeword index (BCI) of each interference channel if the SINR is less than or equal to the second threshold;

the judgment unit is configured to: determine whether the WCI or the BCI meets a preset condition, comprising: for each interference channel whose WCI or BCI is obtained, determining whether a pre-gain of interference channel cooperation is greater than a fifth threshold; if greater than the fifth threshold and the SNR is greater than a sixth threshold, then the WCI or the BCI meeting the preset condition; and the feedback unit is further configured to: feed back the BCI or the WCI meeting the preset condition to the base station.

Alternatively, the codeword matching unit is configured to obtain the WCI or the BCI of each interference channel by the following mode:

obtaining a maximum interference space of G1*interference channel for each interference channel of the user equipment, for each vector in the maximum interference space, projecting every code word in a codeword to the vector, obtaining a code word, of which a norm is maximum and greater than an assigned threshold after projecting; if code words of which the number is the same with the number of vectors of the maximum interference space are found, then taking these code words as WCI;

if code words of which the number is the same with the number of vectors of the maximum interference space are not found, then obtaining a minimum interference space of G1*interference channel; for each vector in the minimum interference space, projecting every code word in a codeword to the vector, obtaining a code word, of which a norm is maximum and greater than an assigned threshold after projecting; if at least one code word can be obtained, then taking the obtained code word as BCI;

wherein the G1 is a detection factor of a detection algorithm currently used by the user equipment.

Alternatively, the G1=a serving cell channel multiplied by a pre-coding matrix indicator (PMI), then transposed; or G1=(F' F)$^{-1}$ F', and F=the serving cell channel multiplied by the PMI.

Alternatively, the codeword matching unit is configured to obtain the maximum interference space by the following mode:

performing SVD decomposition on G1*interference channel, taking a subset from all singular values, wherein the sum of singular values in the subset and the sum of all singular values are greater than a third threshold, taking a V vector corresponding to the singular values in the subset as a vector in the maximum interference space;

the codeword matching unit is configured to obtain the minimum interference space by the following mode:

performing SVD decomposition on the G1*interference channel, and taking a V vector corresponding to non-singular values as a vector in the minimum interference space.

Alternatively, the judgment unit is configured to determine whether the pre-gain of cooperation is greater than the fifth threshold by the following mode:

for any one interference channel, obtaining the signal energy of serving cell, divided by the sum of energy of each interference channel, except the interference channel, and noise energy, and obtaining a SINR_max; and comparing a value obtained by performing subtraction on the SINR_max and the SINR with the fifth threshold, if greater than the fifth threshold, then the pre-gain of the interference channel cooperation being greater than the fifth threshold, otherwise, the pre-gain of the interference channel cooperation being less than or equal to the fifth threshold.

By adopting the above-mentioned technical scheme, compared with the related art, it has the following advantages: 1), it can control the channel quantification loss for the codeword; if the codeword is distorted too much, then the cooperation requirement is not made for this route of interference; 2), it can perform the pre judgment for the cooperation effect; if the difference of the best effect compared with the average is not big, then it is explained indirectly that the channel is all non-ideal relative to all codeword effects at this moment; 3), it can distinguish different SINR situations which are suitable for the comp condition, so as to implement different policies.

PREFERRED EMBODIMENTS OF THE PRESENT INVENTION-DOCUMENT

In order to make the objective, technical scheme and advantage of the present document much more clear and obvious, the embodiment of the present document is described in detail with reference to the accompanying drawings hereinafter. It should be illustrated that, in the case of not conflicting, the embodiments in the present application and features in these embodiments can be combined with each other.

The method for matching an interference channel codeword in an inter-cell multi-antenna coordinated system provided by the embodiment of the present document includes:

a user equipment obtaining a signal to interference plus noise ratio (SINR), or obtaining an SINR and a signal to noise ratio (SNR), and comparing the SINR or the SINR and SNR, with a preset threshold, generating coordinated multi-point transmission/reception (COMP) policy information according to a comparison result, and transmitting the COMP policy information to a base station.

Wherein, the SINR is obtained by the following mode:

obtaining a signal energy of serving cell of the user equipment and an average interference energy of each interference channel of the user equipment, and dividing the signal energy of serving cell by the sum of the average interference energy of each interference channel and noise to obtain the SINR, which is represented as SINR$_{average}$ in the subsequent embodiment.

The COMP policy information is carried by using a first mark;

the comprising the SINR or the SINR and SNR, with the preset threshold and generating the COMP policy information according to the comparison result includes one of the followings or their combination:

if the SINR is greater than the first threshold, a value of the first mark being a first assigned value, to indicate that the user equipment can respond to cooperation requests of other base stations;

if the SINR is less than or equal to the first threshold and greater than a second threshold, then the value of the first mark being a second assigned value, to indicate that the user equipment will not participate in cooperation of other base stations when other base stations are not requested to cooperate; if the user equipment requests other base stations to cooperate, then the user equipment being able to respond to the cooperation requests of other base stations; and if the SINR is less than or equal to the second threshold, then comparing the SNR with a sixth threshold; if the SNR is greater than the sixth threshold, then the value of the first mark being a third assigned value, to indicated that the user equipment can participate in the cooperation; if the SNR is less than or equal to the sixth threshold, then the value of the first mark being a fourth assigned value, to indicate that the user equipment does not participate in the cooperation.

The value of the first mark can be 0-3, and the embodiment of the present document does not limit its value, and it is ok if it can distinguish different COMP policies.

If the SINR is less than or equal to the second threshold, the following steps are further performed:

obtaining a worst codeword index (WCI) or a best codeword index (BCI) of each interference channel;

determining whether the WCI or the BCI meets a preset condition, comprising: for each interference channel whose WCI or BCI is obtained, determining whether a pre-gain of the interference channel cooperation is greater than a fifth threshold; if greater than the fifth threshold and the SNR is greater than the sixth threshold, then the WCI or the BCI meeting the preset condition; and the user equipment further feeding back the BCI or the WCI meeting the preset condition to the base station.

The WCI or the BCI of each interference channel is obtained by the following mode:

obtaining a maximum interference space of G1*interference channel for each interference channel of the user equipment, for each vector in the maximum interference space, projecting every code word in the codeword to the vector, obtaining a code word, of which a norm is maximum and greater than an assigned threshold after the projecting; if code words of which the number is the same with the number of the vectors of the maximum interference space are found, then taking these code words as the WCI;

if the code words of which the number is the same with the number of the vectors of the maximum interference space are not found, then obtaining a minimum interference space of G1*interference channel; for each vector in the minimum interference space, projecting every code word in the codeword to the vector, obtaining a code word, of which a norm is maximum and greater than an assigned threshold after projecting; if at least one code word can be obtained, then taking the obtained code word as the BCI;

wherein the G1 is a detection factor of a detection algorithm currently used by the user equipment.

The G1=a serving cell channel multiplied by a pre-coding matrix indicator (PMI), then transposed; or G1=(F' F)$^{-1}$ F', and F=the serving cell channel multiplied by the PMI. The value of G1 now is only for an example, and it also can be a matrix obtained by other conversions being performed on F.

The maximum interference space is obtained by the following mode:

performing SVD decomposition on the G1*interference channel, taking a subset from all singular values, wherein the sum of the singular values in the subset and the sum of all singular values are greater than a third threshold, taking a V vector corresponding to the singular values in the subset as a vector in the maximum interference space;

the minimum interference space is obtained through the following mode:

performing SVD decomposition on the G1*interference channel, and taking a V vector corresponding to non-singular values as a vector in the minimum interference space.

It is determined whether the pre-gain of the interference channel cooperation is greater than the fifth threshold for each interference channel of the obtained WCI or BCI by the following mode:

for any one interference channel, obtaining the signal energy of serving cell, divided by the sum of energies of various interference channels, except the interference channel self, and noise energy, and obtaining the SINR_max; and comparing a value obtained by performing subtraction on the SINR_max and the SINR with the fifth threshold, if greater than the fifth threshold, then the pre-gain of the interference channel cooperation being greater than the fifth threshold, otherwise, the pre-gain of the interference channel cooperation being less than or equal to the fifth threshold.

When the WCI or the BCI is fed back, it further feeds back the interference number corresponding to the WCI or the BCI, and feeds back the SINR_max obtained by the signal energy of serving cell divided by the sum of energies of various interference channels, except the interference channel corresponding to the current WCI or BCI, and the noise energy. The SINR_max is fed back by using a mode of SINR grade, and the SINR is divided into a plurality of grades in advance, and feedback is performed after determining the grade to which the SINR_max belongs. When the WCI and the BCI is not fed back, it can also feed back the SINR grade, and at this moment, the SINR grade is the grade to which the SINR$_{average}$ belongs.

Figure 2:
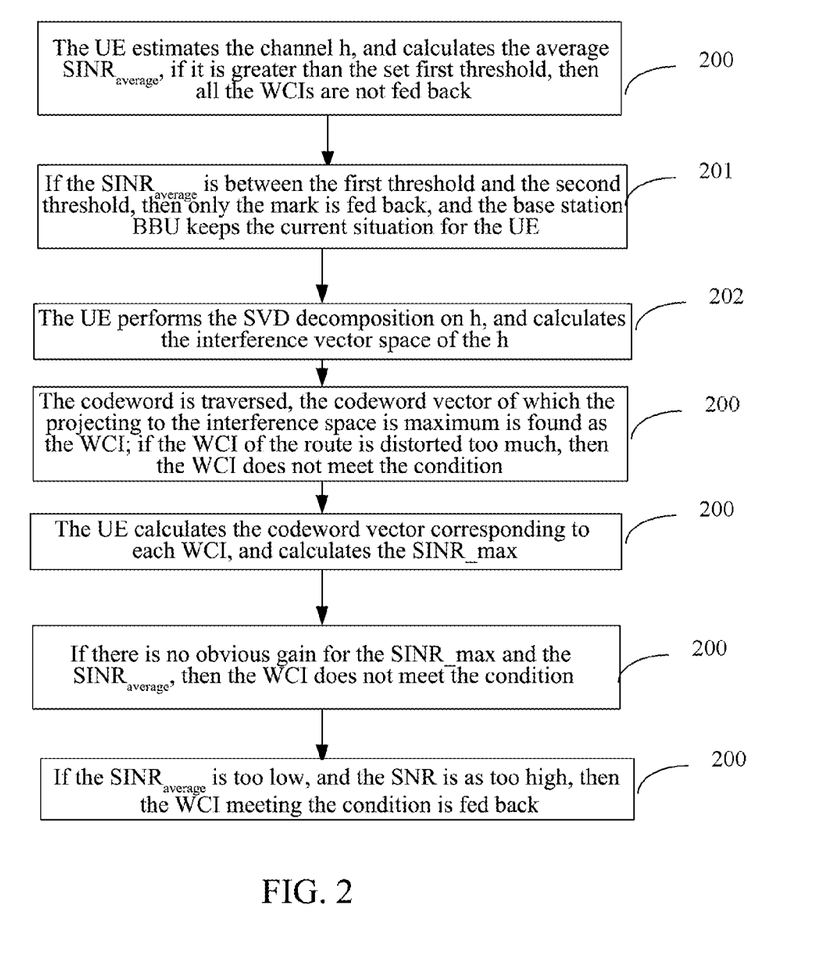
FIG. 2 is a diagram of a method for matching an interference channel codeword according to an embodiment of the present document.

The present document is further explained through the embodiments hereinafter. As shown in FIG. 2, the method for matching the interference channel codeword provided by the embodiment of the present document includes the following steps.

In step 200, the UE estimates the channel h, and the UE matches the signal channel of serving cell to obtain the PMI and calculates the SINR. If the SINR is greater than the first threshold, then the first mark=3, and the codeword is not performed, and step 205 is executed directly.

In step 201, if the SINR is between the first threshold and the second threshold, the codeword is not performed, setting the first mark=1; and step 205 is executed directly, otherwise, if the SINR is less than or equal to the second threshold, then step 202 is executed.

In step 202, for each route of interference, the maximum interference and minimum interference directions are jointly solved through the detection algorithm and the interference channel, and then the codeword is performed to the directions.

In step 203, the UE performs the pre-gain judgment for the interference to which the codeword is performed successfully; if it is greater than the fifth threshold, then the pre-gain meets the condition.

In step 204, if the SINR is less than or equal to the second threshold, then the SNR is obtained.

If the SNR is greater than the sixth threshold, the first mark=0 is set. On the base station side, if the UE initiates the cooperation request, then the UE can also participate in the comp pairing.

If the SNR is less than or equal to the sixth threshold, then all WCIs or BCIs are set as being unsatisfied with the preset condition, and the first mark=2 is set.

The SNR parameter mainly identifies whether the factor causing the SINR to be low is the interference or the noise; if the SNR is low, then it illustrates that the main factor is the noise, and then the comp is not requested; otherwise, the main factor is the interference, and the comp can be requested.

In step 205, the UE sends all the WCI or the BCI, the first mark, the SINR grade and the interference number meeting the conditions obtained through the above-mentioned judgment to the base station. If there is no WCI or BCI meeting the condition, then the first mark and the SINR grade are fed back.

The SINR is greater than the first threshold, which illustrates that the UE performance is higher and can respond to the comp requests of other base stations (which can be decreased some by oneself); if it is between the first and second thresholds, which illustrates that the UE performance can basically meet its own requirement but the performance is not very high; for this kind of situation, if the UE does not request other base stations to cooperate, then the UE does not participate in the comp of other base stations either; if the UE requests the cooperation from other base stations, then the UE can respond to the cooperation requests of other base stations.

The present document is further explained through the specific embodiments hereinafter.

Embodiment 1, Extreme Value Feedback, and Multi Interference Feedback

Figure 3:
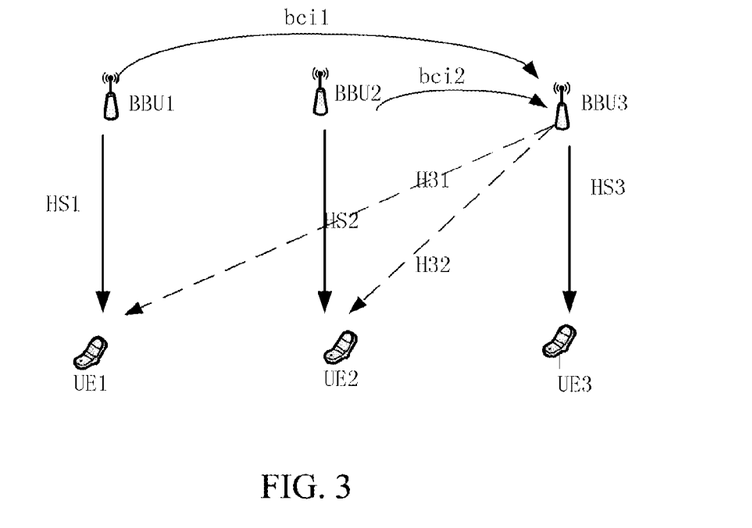
FIG. 3 is a scene diagram of embodiment 1 of the present document.

The scene is shown as in FIG. 3.

For the 3 cells (cells 1~3), one UE is for each cell, and the 3 UEs (UE 1~3) take cells 1~3 as their serving cells respectively.

The interference condition: the UE1 can see the interference of the cells 2 and 3, the UE2 can only see the interference of cell 3, and the UE3 cannot see the interference of other cells.

The signal to noise ratio is 20 dB.

The signal to interference ratio is 0 dB.

There is a UE1 under the base station BBU1, there is a UE2 under the base station BBU2, and there is a UE3 under the base station BBU3.

The channel from the BBU1 to the UE1 is HS1, the channel from the BBU2 to the UE2 is HS2, and the channel from the BBU3 to the UE3 is HS3.

The channel from the BBU2 to the UE1 is H21, the channel from the BBU3 to the UE1 is H31, and the channel from the BBU3 to the UE2 is H32.

In the present embodiment:
the first threshold is 17 (the linear SINR value);
the second threshold is 8 (the linear SINR value);
the third threshold takes 90% of the sum of all singular values;
the fourth threshold is the cosine value of 20 degrees;
the threshold 4_1 is the cosine value of 85 degrees;
the fifth threshold is 5 (the threshold of the difference of the maximum SINR and the average SINR);
the sixth threshold is 20 (the linear SINR value).

The Embodiment 1: The Process for Performing the Codeword to the WCI

The processing procedure of the WCI after performing the codeword is illustrated by taking the UE1 as an example hereinafter.

In step 300, the UE calculates the $SINR_{average}$, wherein:
if the $SINR_{average}$ is greater than the first threshold, then it does not initiate the comp request and does not feed back the WCIs of all interference channels. The first mark=3 is set. And step 307 is executed directly.

If the $SINR_{average}$ is less than or equal to the first threshold, then step 301 is executed.

The calculation method of the $SINR_{average}$ is: for the serving cell signal, the signal energy of serving cell is calculated by using the serving cell channel and the codeword of serving cell; for each interference channel, the interference energy is calculated by using the interference channel and all codewords, and then the average value is taken, to obtain the average interference energy of the interference channel, and finally the signal energy of serving cell is divided by the sum of energies of various interference channels and noise to get the $SINR_{average}$.

In the present embodiment,
the UE1 estimates the channel HS1=
−0.7712−0.5188i−0.9206−1.2039i 0.0528+0.4222i−1.1336+1.4030i
0.0475−1.1845i−1.7066−0.3378i 0.5887+0.5373i 0.4872−0.5189i The estimated H21 is:
H21=
0.7331−1.3260i 0.2025−1.3355i 0.4702+1.0146i 0.9260+1.1683i
0.8876−0.3845i−0.0708+0.5709i−0.4170+0.4493i−0.4157+1.0397i The estimated H31 is:
H31=
−0.7953+0.0466i−0.8210−0.9246i−0.7735+0.2218i 0.2708+0.1692i
−0.3449+0.6925i 0.4431+1.0908i−0.9205+0.0923i−1.2330+0.3248i In the present document, the $SINR_{average}$ is equal to 3.2123, less than or equal to first threshold. UE1 performs codeword matching for the signal channel HS1 of serving cell and obtains PMI1=9.

In step 301, the SINR is 3.2123, which is less than the second threshold, and step 302 is executed.

In step 302, the UE processes each route of interference: for the (G1*interference channel), its maximum interference space V is jointly solved, and the vector in V meets that the sum of energy of the (G1*interference channel)*v is greater than the third threshold, wherein, v is the vector in V.

A solution method is that: after the G1 is multiplied by the interference channel h, and then the SVD decomposition is performed to get a subset, and a ratio of the sum of the singular values of the subset divided by the sum of all singular values is greater than the third threshold, and the v vectors corresponding to various singular values in the subset form the V vector space. G1=the serving cell channel multiplied by the PMI, and then transposed; or G1=(F'F)$^{-1}$ F', and F=the serving cell channel multiplied by the PMI.

The above-mentioned processing is done to each route of the interference channel.

In step 303, the codeword processing is performed; for each vector in the maximum interference space, every code word (also called the codeword vector) in the codeword is projected to the vector, and a code word, of which a norm is maximum and greater than an assigned threshold after projecting is obtained, including the following.

The projecting vector is obtained from projecting all codeword vectors to the first v vector in the V vector space, and the codeword vector of which the ratio between the projecting vector norm and the codeword vector norm is maximum is obtained, and the ratio is greater than the fourth threshold. If there are multiple similar codewords, then the codeword of which the norm is maximum when projecting to other v vectors is selected. Because various the codeword vector norms are same, in fact, it takes the codeword vector, of which the projecting vector norm is maximum and greater than the assigned threshold.

The projecting vector is obtained from projecting all codeword vectors to the second v vector in the V vector space, and the codeword vector of which the ratio between the projecting vector norm and the codeword vector norm is maximum is obtained, and the ratio is greater than the threshold 4_1. If there are multiple similar codewords, then the codeword of which the norm is maximum when projecting to other v vectors is selected.

The fourth threshold is set as: $\cos(\alpha)$, and $\alpha$ is set manually. The threshold 4_1 is set as: $\cos(\min(k*(a1/a2)\alpha, 90'))$, wherein a1 and a2 are singular values, and k is set manually.

If there are more v vectors existing in the V vector space, then it is processed similarly.

If the codeword vectors of which the number is the same with the number of the vectors of the V vector space are found, then these codeword vectors form a set A, as the WCI; otherwise, then (for the G*interference channel) its minimum interference space is jointly solved, to make the norm of (the G1*interference channel) *w is minimum, and the minimum interference space is as the null space A.

For each vector in the minimum interference space, every code word in the codeword is projected to the vector, and the code word, of which the norm is maximum and greater than the assigned threshold after projecting is obtained; if at least one code word can be obtained, then the obtained code word is taken as the BCI; one mode is that: for the codeword of which the ratio of the vector norms before and after projecting is maximum and greater than the assigned threshold B, the set B is formed. If the set B is not empty, then the set B is taken as the BCI. The threshold B can be set depending upon requirement.

The above-mentioned processing is done for each route of the interference channel, to obtain the WCI or the BCI of each route of the interference channel.

In the present embodiment, the specific processing for performing the codeword is as follows.

UE1 performing the codeword processing for the H21 is that:

the UE1 transposes the (HS1 multiplied by the PMI1) and then multiplied by the H21 to get the result as follows:

(HS1*PMI1)'*H21=
1.2107+2.9151i    1.9643−0.0680i−1.7193−0.4116i−2.5878−0.4562i

The SVD decomposition is performed on the above formula to get the singular value and the V vector space, as follows:

the singular value=4.8844
the V vector space=
0.2479−0.5968i
0.4022+0.0139i
−0.3520+0.0843i
−0.5298+0.0934i The ratio of the sum of the singular values divided by the sum of all singular values greater than the third threshold 0.9 is taken, including one singular value 4.8844, and the corresponding v vectors form the v vector space.

The projecting vector is obtained from projecting all codeword vectors to the first v vector in the V vector space, and the maximum ratio between the projecting vector norm and the codeword vector norm is 0.8551, and they are all less than the fourth threshold. Therefore, the WCI does not meet the preset condition.

Because the WCI does not meet the preset condition, then the SVD decomposition is performed for (the G1*interference channel), to obtain the null space A formed by the vectors corresponding to the non-singular values. Because all ratios of norms of vectors before and after projecting all codeword vector to the null space A are less than the assigned threshold B, the set B is empty. Therefore, the BCI does not meet the condition.

UE1 performing the codeword processing for the h31 is that:

the UE1 transposes the (HS1 multiplied by the PMI1) and then multiplied by the H31 to get the result as follows:

(HS1*PMI1)'*H31=
0.0984−2.6378i 0.4448−2.3244i 1.0305−2.2752i
1.0531−0.9653i

The SVD decomposition is performed on the above formula to obtain the singular value and the V vector space, as follows:

the singular value=4.5659
the V vector space=
0.0216+0.5777i
0.0974+0.5091i
0.2257+0.4983i
0.2306+0.2114i The ratio of the sum of the singular values divided by the sum of all singular values greater than 0.9 is taken, including one singular value 4.5659, and the corresponding v vectors form the v vector space. The included singular values multiplied by the corresponding v vectors are taken as the interference vector space.

The projecting vector is obtained from projecting all codeword vectors to the first v vector in the V vector space, and the ratio between the projecting vector norm and the codeword vector norm is 0.9432 at most, and they are all greater than the fourth threshold. Therefore, the WCI meets the preset condition.

In step 304, the UE1 calculates the SINR_max for each interference channel after performing the codeword, and the calculation method is as follows:

the SINR_max is obtained by using the signal energy of serving cell, divided by the sum of energies of various interference channels, except the current interference channel, and noise energy.

In the present embodiment, for the UE1, only h31 finds the codeword, so the SINR_max of h31 is calculated as 12.8731.

In step 305, the SINR_max− the $SINR_{average}$> the fifth threshold, so the WCI of the h31 after performing the codeword meets the condition.

In step 306, because the $SINR_{average}$ is less than the second threshold and the SNR (as 27.5617) is greater than the sixth threshold, the first mark=0. At the base station side, if the CELL1 decides to initiate the cooperation request to the adjacent station (that is, the interference source base station) for the UE1, then the UE1 can participate in the comp pairing of the CELL1 as well.

In step 307, the UE1 sends the WCI of h31 after performing the codeword, the first mark=0, the SINR grade and the interference number which are from the above-mentioned judgment to the base station.

The interference number is corresponding to the WCI number.

The signal energy of cell 1 is divided by the sum of the energies of interference channels, except h31, and the noise energy, and its result is SINR (12.87), and its corresponding SINR grade is obtained.

Figure 4:
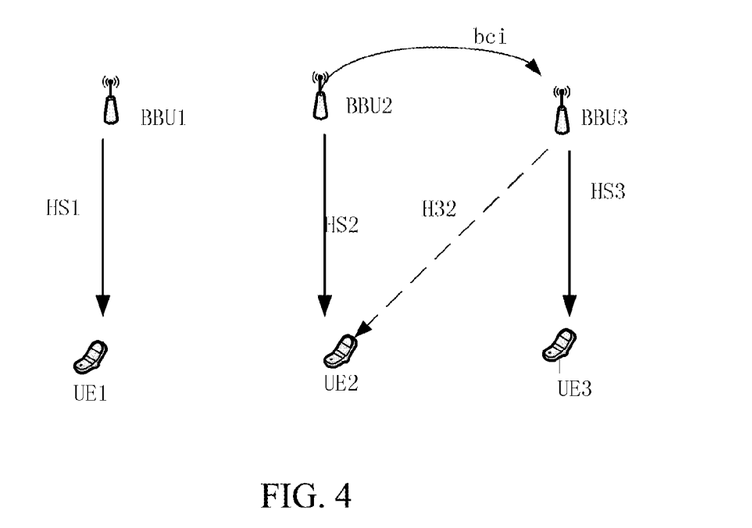
FIG. 4 is a scene diagram of embodiment 2 of the present document.

Embodiment 2, the Process of Performing the Codeword for the BCI as shown in FIG. 4, the control process of performing the codeword for the BCI is explained by taking the UE2 as an example.

In step 400, the UE2 estimates the channel HS2, and the UE side matches the signal channel of serving cell and obtains the PMI.

HS2=
−0.2176−1.0324i−0.1312−0.3420i    0.3248+0.5327i−0.4561−0.5054i
−0.2900−0.4744i−0.4233+0.2024i−0.2476+0.2949i−0.4397+0.7501i

H32=
−0.0836+0.5493i−0.5266−1.4763i−0.6017+0.0298i−1.1231+0.1479i
0.4595−0.1970i 1.4379−0.1654i 1.6584+0.2242i 0.6431+0.0285i

The UE2 performs codeword matching on the signal channel HS2 of serving cell and obtains the PMI2=14.

The UE2 calculates the $SINR_{average}$ as 3.2768, less than or equal to the first threshold, and step 401 is executed.

The calculation method of the $SINR_{average}$ is: for the serving cell signal, the signal energy of serving cell is calculated by using the serving cell channel and the codeword of serving cell; for each interference channel, the interference energy is calculated by using the interference channel and all codewords, and then the average value is obtained, and finally the signal energy of serving cell is divided by the sum of energies of various interference channels and noise to get the SINRaverage.

In step 401, in the present embodiment, the $SINR_{average}$ is less than the second threshold, and step 402 is executed.

In step 402, the UE2 process the H32: the SVD decomposition is performed on (the G1*H32), and a ratio of the sum of the singular values divided by the sum of all singular values greater than the third threshold is taken, and the included v vectors form the V vector space. G1=the serving cell channel multiplied by the PMI, and then transposed; or G1=(F'F)$^{-1}$ F', and F=the serving cell channel multiplied by the PMI.

(HS2*PMI2)'*H32=
−0.8415−0.3640i    1.4122+0.1417i−0.4265−0.9961i 0.1673−1.5101i

It is obtained after the SVD decomposition:
the singular value=2.5174;
the V vector space=
−0.3343+0.1446i
0.5610−0.0563i
−0.1694+0.3957i
0.0665+0.5999i In step 403, the projecting vector is obtained from projecting all codeword vectors to the first v vector in the V vector space, and the maximum ratio between the projecting vector norm and the codeword vector norm is 0.7843, and they are all less than the fourth threshold. Therefore, the WCI does not meet the preset condition.

Because the WCI does not meet the preset condition, then the SVD decomposition is performed on (the G1*interference channel), and the vector space corresponding to the non-singular values is the null space A.

A=
{0.5600−0.0652i−0.2502−0.3502i−0.0636−0.6002i
0.7645+0.0255i 0.1040+0.1479i 0.0247+0.2523i
0.0698−0.1668i 0.8628+0.0149i−0.1778−0.0766i
−0.0299−0.2518i−0.1572+0.1129i 0.7302+0.0292i}

The projecting vector is obtained from projecting all codeword vectors to the null space A, and there are two codewords of which the ratios of the norms of vectors before and after the projecting are maximum and greater than the assigned threshold B, number 10 and number 13 codewords respectively, to form the set B. And the set B is taken as the BCI of the interference channel.

In step 404, the UE2 calculates the SINR_max, as 198.23, for the H32.

In step 405, because the SINR_max-$SINR_{average}$> the fifth threshold, the BCI meets the condition.

In step 406, because the $SINR_{average}$ is less than the second threshold and the SNR is 22.98, greater than the sixth threshold, the first mark=0. At the base station side, if the UE initiates the cooperation request, then the UE can participate in the comp pairing.

In step 407, the UE sends all the WCI or the BCI, the first mark, the SINR grade and the interference number meeting the conditions obtained through the above-mentioned judgment to the base station.

Its SINR grade is calculated by using the SINR obtained by the signal energy of serving cell divided by the sum of the energies of interference channels, except the channel feeding back the BCI or the WCI, and the noise energy.

Figure 5:
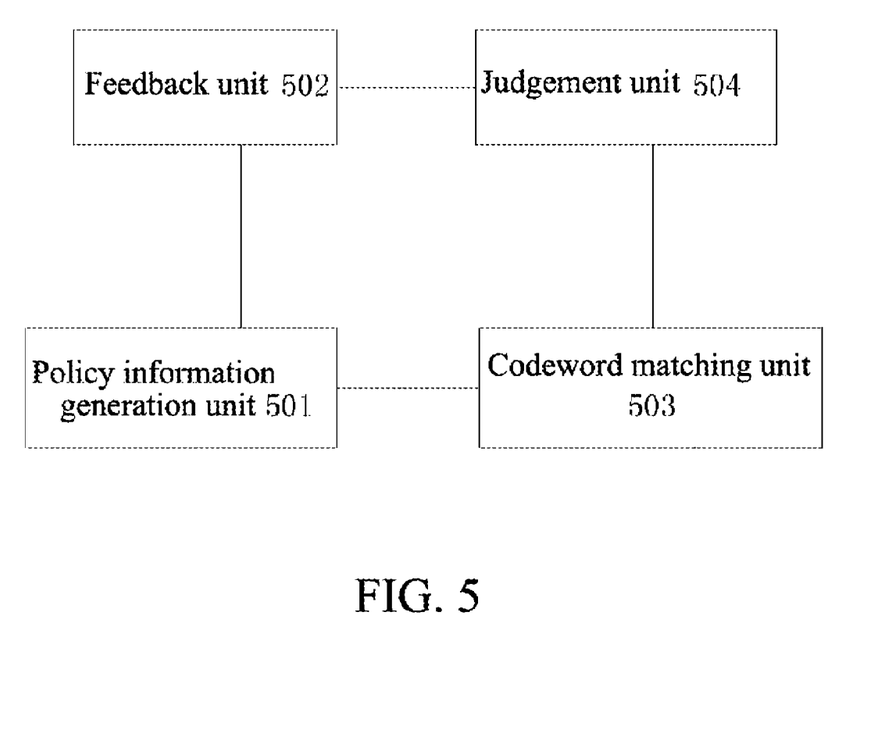
FIG. 5 is a block diagram of a user equipment according to an embodiment of the present document.

The embodiment of the present document further provides a user equipment, as shown in FIG. 5, including the following units:

the policy information generation unit 501 is configured to: obtain a signal to interference plus noise ratio (SINR), or obtain a SINR and a signal to noise ratio (SNR), and compare the SINR or the SINR and the SNR, with a preset threshold, and generate coordinated multi-point transmission/reception (COMP) policy information according to a comparison result; and the feedback unit 502 is configured to: transmit the COMP policy information to a base station.

The policy information generation unit is configured to obtain the SINR by the following mode:

obtaining signal energy of serving cell of the user equipment and average interference energy of each interference channel of the user equipment, and dividing the signal energy of serving cell by the sum of the average interference energy of each interference channel and noise to obtain the SINR.

The policy information generation unit is further configured to use a first mark to indicate the COMP policy information;

the policy information generation unit is configured to generate the COMP policy information including one of the follows or their combination:

if the SINR is greater than the first threshold, a value of the first mark being a first assigned value, to indicate that the user equipment can respond to cooperation requests of other base stations;

if the SINR is less than or equal to the first threshold and greater than a second threshold, then the value of the first mark being a second assigned value, to indicate that the user equipment will not participate in cooperation of other base stations when other base stations are not requested to cooperate; if the user equipment requests other base stations to cooperate, then the user equipment being able to respond to the cooperation requests of other base stations; and if the SINR is less than or equal to the second threshold, then comparing the SNR with a sixth threshold; if the SNR is greater than the sixth threshold, then the value of the first mark being a third assigned value, to indicate that the user equipment can participate in the cooperation; if the SNR is less than or equal to the sixth threshold, then the value of the first mark being a fourth assigned value, to indicate that the user equipment does not participate in the cooperation.

The user equipment further includes a codeword matching unit 503 and a judgment unit 504, wherein the codeword matching unit 503 is configured to: obtain a worst codeword index (WCI) or a best codeword index (BCI) of each interference channel if the SINR is less than or equal to the second threshold;

the judgment unit 504 is configured to: determine whether the WCI or the BCI meets a preset condition, comprising: for each interference channel whose WCI or BCI is obtained, determining whether a pre-gain of the interference channel cooperation is greater than a fifth threshold; if greater than the fifth threshold and the SNR is greater than a sixth threshold, then the WCI or the BCI meeting the preset condition; and the feedback unit 502 is further configured to: feed back the BCI or the WCI meeting the preset condition to the base station.

The codeword matching unit 503 is configured to obtain the WCI or the BCI of each interference channel by the following mode:

obtaining a maximum interference space of G1*interference channel for each interference channel of the user equipment, for each vector in the maximum interference space, projecting every code word in a codeword to the vector, obtaining a code word, of which a norm is maximum and greater than an assigned threshold after projecting; if code words of which the number is the same with the number of vectors of the maximum interference space are found, then taking these code words as WCI;

if the code words of which the number is the same with the number of the vectors of the maximum interference space are not found, then obtaining a minimum interference space of G1*interference channel; for each vector in the minimum interference space, projecting every code word in the codeword to the vector, obtaining a code word, of which a norm is maximum and greater than an assigned threshold after projecting; if at least one code word can be obtained, then taking the obtained code word as the BCI;

wherein the G1 is a detection factor of a detection algorithm currently used by the user equipment.

The G1=a serving cell channel multiplied by a pre-coding matrix indicator (PMI), then transposed; or G1=(F' F)$^{-1}$ F', and F=the serving cell channel multiplied by the PMI, and F' is the transpose of F.

The codeword matching unit 503 is configured to obtain the maximum interference space by the following mode:

performing SVD decomposition on the G1*interference channel, taking a subset from all singular values, wherein the sum of the singular values in the subset and the sum of all singular values are greater than a third threshold, taking a V vector corresponding to the singular values in the subset as a vector in the maximum interference space;

the codeword matching unit is configured to obtain the minimum interference space by the following mode:

performing SVD decomposition on the G1*interference channel, and regarding a V vector corresponding to non-singular values as a vector in the minimum interference space.

The judgment unit 504 is configured to determine whether the pre-gain of the cooperation is greater than the fifth threshold by the following mode:

for any one interference channel, obtaining the signal energy of serving cell, divided by the sum of energies of various interference channels, except the interference channel self, and noise energy, and obtaining the SINR_max; and comparing a value obtained by performing subtraction on the SINR_max and the SINR with the fifth threshold, if greater than the fifth threshold, then the pre-gain of the interference channel cooperation being greater than the fifth threshold, otherwise, the pre-gain of the interference channel cooperation being less than or equal to the fifth threshold.

In the above-mentioned embodiment, the SINR also can be replaced by using other channel quality parameters.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

INDUSTRIAL APPLICABILITY

By adopting the above-mentioned technical scheme, compared with the related art, it has the following advantages: 1), it can control the channel quantification loss for the codeword; if the codeword is distorted too much, then the cooperation requirement is not made for this route of interference; 2), it can perform the pre judgment for the cooperation effect; if the difference of the best effect compared with the average is not big, then it is explained indirectly that the channel is non-ideal relative to all codeword effects at this moment; 3), it can distinguish different SINR situations which are suitable for the comp condition, so as to implement different policies. So the present document has very strong industrial applicability.

What we claim is:

1. A method for matching an interference channel codeword in an inter-cell multi-antenna coordinated system, comprising:

a user equipment obtaining a signal to interference plus noise ratio (SINR), or obtaining a SINR and a signal to noise ratio (SNR), and comparing the SINR or the SINR and SNR, with a preset threshold, generating coordinated multi-point transmission/reception (COMP) policy information according to a comparison result, and transmitting the COMP policy information to a base station; wherein the method further comprises: using a first mark to carry the COMP policy information;

the step of comparing the SINR or the SINR and SNR with the preset threshold and generating the COMP policy information according to the comparison result comprises:

if the SINR is greater than a first threshold, a value of the first mark being a first assigned value, to indicate that the user equipment can respond to cooperation requests of other base stations;

if the SINR is less than or equal to the first threshold and greater than a second threshold, then the value of the first mark being a second assigned value, to indicate that the user equipment will not participate in cooperation of other base stations when other base stations are not requested to cooperate; if the user equipment requests other base stations to cooperate, then the user equipment being able to respond to the cooperation requests of other base stations; and if the SINR is less than or equal to the second threshold, then comparing the SNR with a sixth threshold; if the SNR is greater than the sixth threshold, then the value of the first mark being a third assigned value, to indicate that the user equipment can participate in the cooperation; if the SNR is less than or equal to the sixth threshold, then the value of the first mark being a fourth assigned value, to indicate that the user equipment does not participate in the cooperation.

2. The method according to claim 1, wherein the step of the user equipment obtaining the SINR comprises:

obtaining a signal energy of serving cell of the user equipment and an average interference energy of each interference channel of the user equipment, and dividing the signal energy of serving cell by the sum of the average interference energy of each interference channel and noise to obtain the SINR.

3. The method according to claim 2, further comprising:
if the SINR is less than or equal to the second threshold, then performing following steps:
obtaining a worst codeword index (WCI) or a best codeword index (BCI) of each interference channel;
determining whether the WCI or the BCI meets a preset condition: comprising: for each interference channel whose WCI or BCI is obtained, determining whether a pre-gain of interference channel cooperation is greater than a fifth threshold; if greater than the fifth threshold and the SNR is greater than the sixth threshold, then the WCI or the BCI meeting the preset condition; and
the user equipment further feeding back the BCI or WCI meeting the preset condition to the base station.

4. The method according to claim 1, further comprising:
if the SINR is less than or equal to the second threshold, then performing following steps:
obtaining a worst codeword index (WCI) or a best codeword index (BCI) of each interference channel;
determining whether the WCI or the BCI meets a preset condition: comprising: for each interference channel whose WCI or BCI is obtained, determining whether a pre-gain of interference channel cooperation is greater than a fifth threshold; if greater than the fifth threshold and the SNR is greater than the sixth threshold, then the WCI or the BCI meeting the preset condition; and
the user equipment further feeding back the BCI or WCI meeting the preset condition to the base station.

5. The method according to claim 4, wherein the step of obtaining the WCI or BCI of each interference channel comprises:
obtaining a maximum interference space of G1* interference channel for each interference channel of the user equipment, for each vector in the maximum interference space, projecting every code word in a codeword to the vector, obtaining a code word, of which a norm is maximum and greater than an assigned threshold after projecting; if code words of which the number is the same with the number of vectors of the maximum interference space are found, then taking these code words as the WCI;
if the code words of which the number is the same with the number of the vectors of the maximum interference space are not found, then obtaining a minimum interference space of G1* interference channel; for each vector in the minimum interference space, projecting every code word in a codeword to the vector, obtaining a code word, of which a norm is maximum and greater than an assigned threshold after projecting; if at least one code word can be obtained, then taking the obtained code word as the BCI;
wherein the G1 is a detection factor of a detection algorithm currently used by the user equipment.

6. The method according to claim 5, wherein the G1=a serving cell channel multiplied by a pre-coding matrix indicator (PMI), then transposed; or $G1=(F' F)^{-1} F'$, and F=the serving cell channel multiplied by the PMI.

7. The method according to claim 5, wherein the step of obtaining the maximum interference space of the G1* interference channel comprises:

performing SVD decomposition on the G1* interference channel, taking a subset from all singular values, wherein the sum of singular values in the subset and the sum of all singular values are greater than a third threshold, taking a V vector corresponding to the singular values in the subset as a vector in the maximum interference space;
the minimum interference space is obtained through a following mode:
performing SVD decomposition on the G1* interference channel, and taking a V vector corresponding to non-singular values as a vector in the minimum interference space.

8. The method according to claim 5, wherein the step of determining whether the pre-gain of the interference channel cooperation is greater than the fifth threshold for each interference channel whose WCI or BCI is obtained comprises:
for any one interference channel, obtaining the signal energy of serving cell, divided by the sum of energy of each interference channel, except the interference channel self, and noise energy, and obtaining a SINR_max; and
comparing a value obtained by performing subtraction on the SINR_max and the SINR with the fifth threshold, if greater than the fifth threshold, then the pre-gain of the interference channel cooperation being greater than the fifth threshold, otherwise, the pre-gain of the interference channel cooperation being less than or equal to the fifth threshold.

9. The method according to claim 1, further comprising:
if the SINR is less than or equal to the second threshold, then performing following steps:
obtaining a worst codeword index (WCI) or a best codeword index (BCI) of each interference channel;
determining whether the WCI or the BCI meets a preset condition: comprising: for each interference channel whose WCI or BCI is obtained, determining whether a pre-gain of interference channel cooperation is greater than a fifth threshold; if greater than the fifth threshold and the SNR is greater than the sixth threshold, then the WCI or the BCI meeting the preset condition; and
the user equipment further feeding back the BCI or WCI meeting the preset condition to the base station.

10. A user equipment, comprising: a policy information generation unit and a feedback unit, wherein
the policy information generation unit is configured to: obtain a signal to interference plus noise ratio (SINR), or obtain a SINR and a signal to noise ratio (SNR), and compare the SINR or the SINR and SNR, with a preset threshold, and generate coordinated multi-point transmission/reception (COMP) policy information according to a comparison result; and
the feedback unit is configured to: transmit the COMP policy information to a base station wherein
the policy information generation unit is further configured to: use a first mark to express the COMP policy information;
the policy information generation unit is configured to generate the COMP policy information by a following mode:
if the SINR is greater than a first threshold, a value of the first mark being a first assigned value, to indicate that the user equipment can respond to cooperation requests of other base stations;
if the SINR is less than or equal to the first threshold and greater than a second threshold, then the value of the first mark being a second assigned value, to indicate that the user equipment will not participate in cooperation of other base stations when other base stations are not requested to cooperate; if the user equipment requests other base stations to cooperate, then the user equipment being able to respond to the cooperation requests of other base stations; and if the SINR is less than or equal to the second threshold, then comparing the SNR with a sixth threshold; if the SNR is greater than the sixth threshold, then the value of the first mark being a third assigned value, to indicate that the user equipment can participate in the cooperation; if the SNR is less than or equal to the sixth threshold, then the value of the first mark being a fourth assigned value, to indicate that the user equipment does not participate in the cooperation.

11. The user equipment according to claim 10, wherein the policy information generation unit is configured to: obtain the SINK by a following mode:

obtaining a signal energy of serving cell of the user equipment and an average interference energy of each interference channel of the user equipment, and dividing the signal energy of serving cell by the sum of the average interference energy of each interference channel and noise to obtain the SINR.

12. The user equipment according to claim 11, further comprising a codeword matching unit and a judgment unit, wherein the codeword matching unit is configured to: obtain a worst codeword index (WCI) or a best codeword index (BCI) of each interference channel if the SINR is less than or equal to the second threshold;

the judgment unit is configured to: determine whether the WCI or the BCI meets a preset condition, comprising: for each interference channel whose WCI or BCI is obtained, determining whether a pre-gain of interference channel cooperation is greater than a fifth threshold; if greater than the fifth threshold and the SNR is greater than the sixth threshold, then the WCI or the BCI meeting the preset condition; and the feedback unit is further configured to: feed back the BCI or the WCI meeting the preset condition to the base station.

13. The user equipment according to claim 10, further comprising a codeword matching unit and a judgment unit, wherein the codeword matching unit is configured to: obtain a worst codeword index (WCI) or a best codeword index (BCI) of each interference channel if the SINR is less than or equal to the second threshold;

the judgment unit is configured to: determine whether the WCI or the BCI meets a preset condition, comprising: for each interference channel whose WCI or BCI is obtained, determining whether a pre-gain of interference channel cooperation is greater than a fifth threshold; if greater than the fifth threshold and the SNR is greater than the sixth threshold, then the WCI or the BCI meeting the preset condition; and the feedback unit is further configured to: feed back the BCI or the WCI meeting the preset condition to the base station.

14. The user equipment according to claim 13, wherein the codeword matching unit is configured to obtain the WCI or the BCI of each interference channel by a following mode:

obtaining a maximum interference space of G1* interference channel for each interference channel of the user equipment, for each vector in the maximum interference space, projecting every code word in a codeword to the vector, obtaining a code word, of which a norm is maximum and greater than an assigned threshold after projecting; if code words of which the number is the same with the number of vectors of the maximum interference space are found, then taking these code words as the WCI;

if the code words of which the number is the same with the number of the vectors of the maximum interference space are not found, then obtaining a minimum interference space of G1* interference channel; for each vector in the minimum interference space, projecting every code word in a codeword to the vector, obtaining a code word, of which a norm is maximum and greater than an assigned threshold after projecting; if at least one code word can be obtained, then taking the obtained code word as the BCI;

wherein the G1 is a detection factor of a detection algorithm currently used by the user equipment.

15. The user equipment according to claim 14, wherein the G1=a serving cell channel multiplied by a pre-coding matrix indicator (PMI), then transposed; or G1=(F' F)$^{-1}$ F', and F=the serving cell channel multiplied by the PMI.

16. The user equipment according to claim 14, wherein the codeword matching unit is configured to obtain the maximum interference space by a following mode:

performing SVD decomposition on G1* interference channel, taking a subset from all singular values, wherein the sum of singular values in the subset and the sum of all singular values are greater than a third threshold, taking a V vector corresponding to the singular values in the subset as a vector in the maximum interference space;

the codeword matching unit is configured to obtain the minimum interference space by a following mode:

performing SVD decomposition on the G1* interference channel, and taking a V vector corresponding to non-singular values as a vector in the minimum interference space.

17. The user equipment according to claim 14, wherein the judgment unit is configured to determine whether a pre-gain of cooperation is greater than the fifth threshold by a following mode:

for any one interference channel, obtaining the signal energy of serving cell, divided by the sum of energy of each interference channel, except the interference channel self, and noise energy, and obtaining a SINR_max; and comparing a value obtained by performing subtraction on the SINR_max and the SINR with the fifth threshold, if greater than the fifth threshold, then the pre-gain of the interference channel cooperation being greater than the fifth threshold, otherwise, the pre-gain of the interference channel cooperation being less than or equal to the fifth threshold.

18. The user equipment according to claim 10, further comprising a codeword matching unit and a judgment unit, wherein the codeword matching unit is configured to: obtain a worst codeword index (WCI) or a best codeword index (BCI) of each interference channel if the SINR is less than or equal to the second threshold;

the judgment unit is configured to: determine whether the WCI or the BCI meets a preset condition, comprising: for each interference channel whose WCI or BCI is obtained, determining whether a pre-gain of interference channel cooperation is greater than a fifth threshold; if greater than the fifth threshold and the SNR is greater than the sixth threshold, then the WCI or the BCI meeting the preset condition; and the feedback unit is further configured to: feed back the BCI or the WCI meeting the preset condition to the base station.

* * * * *